United States Patent [19]

Walberg et al.

[11] 4,233,666

[45] Nov. 11, 1980

[54] DRIVE POWER SEQUENCING

[75] Inventors: Per-Erik Walberg, San Jose; Donald F. Johann, Palo Alto; Charles E. Mendenhall, Campbell, all of Calif.

[73] Assignee: Sperry Rand Corporation, New York, N.Y.

[21] Appl. No.: 952,767

[22] Filed: Oct. 19, 1978

[51] Int. Cl.[2] .................................... G06F 1/00

[52] U.S. Cl. .................................... 364/900; 318/102

[58] Field of Search .................... 364/700, 900, 104; 318/101, 102, 103, 104, 562; 328/75; 361/29; 307/41

[56] References Cited

U.S. PATENT DOCUMENTS 4,055,786 10/1977 Dimarzio .................... 318/102

*Primary Examiner*—Charles D. Miller

*Attorney, Agent, or Firm*—Kenneth R. Allen; Eugene T. Battjer; William E. Cleaver

[57] ABSTRACT

In a digital information storage system or the like, start up power sequencing for independently operable machines such as disk drives each equipped with a microprocessing unit is provided through a simplified power sequencing circuit. The power sequencing circuit is operatively coupled with an independent preprogrammable micropocessing unit in each machine and to a single control line common to all disk drives. The microprocessing unit is preprogrammed to interact with the power sequencing circuit to provide Enable/Disable signals to the control line and to sense the state of the control line. In particular, the microprocessing unit executes a preprogrammed sequence of steps in interaction with the control line to sequence the start-up of each spindle motor irrespective of the number of disk drives coupled to the control line, thereby preventing electrical power overload.

16 Claims, 4 Drawing Figures

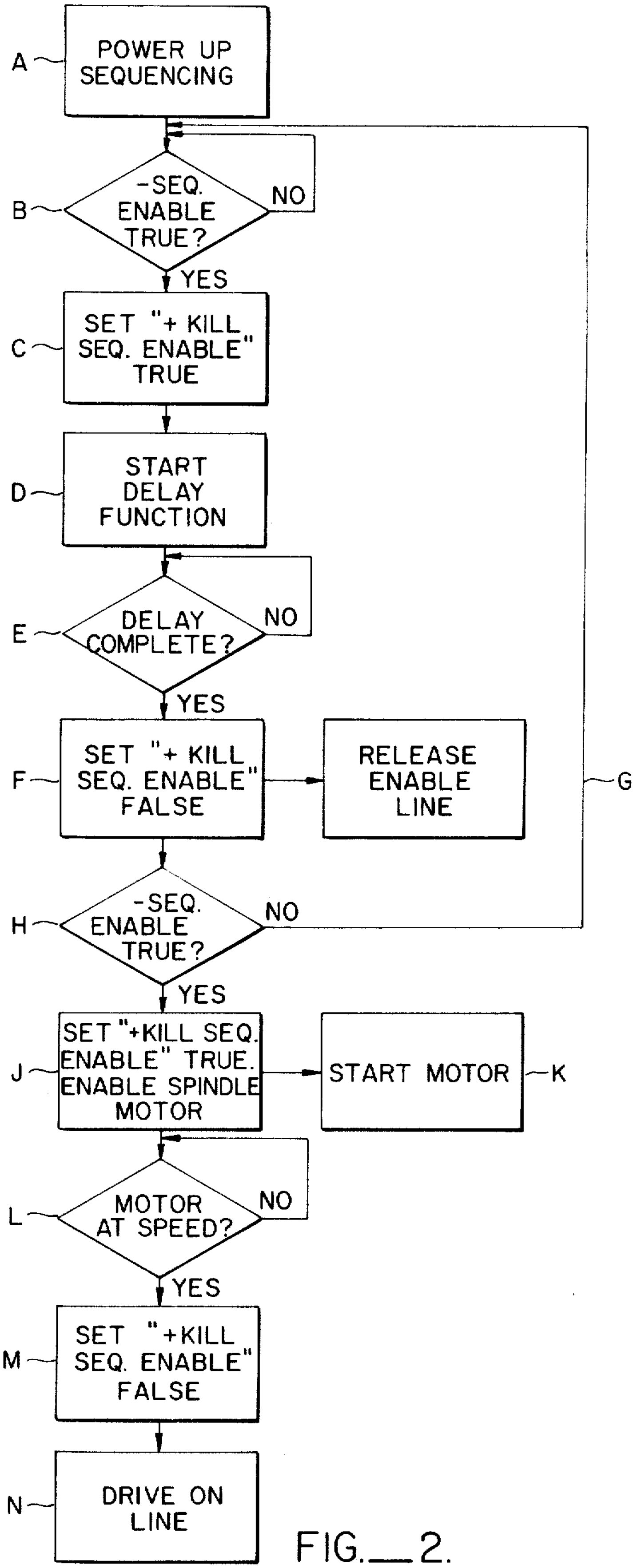
FIG.__2.

DRIVE POWER SEQUENCING

BACKGROUND OF THE INVENTION

1. Field of the Invention

This invention relates to computer disk drives and particularly relates to a technique for providing start up power to individual spindle motors of a plurality of disk drives.

A disk drive is a mass data storage peripheral unit employed with a digital computer. In a large computer installation, there may be two or more and typically up to eight disk drives employed. In order to facilitate rapid data storage and retrieval from moveable disks, a disk normally propels the storage disks continuously throughout the period of operation of the computer. The motor coupled to the spindle supporting the disks is called a spindle motor.

Generally about ten to fifteen seconds are required to bring an idle spindle motor up to operating speed. The starting torque of a typical spindle motor is such that 35 to 50 amperes of current may be drawn from the electrical power source. If as many as eight spindle motors are started simultaneously, an undesired peak load of as much as 400 amperes can be drawn for a short period of time. Such a peak load can cause damage to the power source and to power carrying cables. Therefore, means are needed to start up the spindle motors of a disk drive which avoids power source overload and consequent damage.

2. Description of the Prior Art

Disk drive sequencing is well-known. In one common technique, a three wire control circuit is required. Basically, the technique requires a Sequence "Pick In" line connected in series with a Sequence "Pick Out" line and a Sequence Enable (SE) line. (Additionally a ground or common is needed.) Through the SE line, a master controller issues a signal to supply AC power to a string of drives. The SE line designates which drive is started first. The SE signal to a particular drive causes the Sequence Pick In/Sequence Pick Out lines to be interrupted thereby preventing any other disk drive from powering up.

The above technique has inherent limitations. It is dependent upon an external controller and also requires at least three control signal lines for proper operation. Moreover, it is ill-adapted to make use of the independent decision-making capabilities of disk drives. Present state of the art disk drives now incorporate preprogrammable control units employing a microprocessor. New start up control techniques are needed in order to take advantage of the availability of independent decision-making capabilities of each such disk drive, namely to take advantage of the availability of the microprocessing unit and programmable functions therein.

SUMMARY OF THE INVENTION

According to the invention, disk drive start up power sequencing is provided through a simplified power sequencing circuit operatively coupled with each independent control unit in each disk drive through a single control line common to all disk drives. Each independent control unit is equipped with a preprogrammable microprocessor unit. The power sequencing circuit provides Enable/Disable signals to the single control line and senses the state of the control line. The microprocessing unit executes a preprogrammed sequence of steps in interaction with the control line to sequence the start up of each spindle motor irrespective of the number of disk drives coupled to the control line, thereby minimizing the possibility of power overload.

The invention is adaptable to any other application wherein a random number of independently operable machines having a minimum number of interconnections is to operate a special operating mode in a random mutually exclusive sequence responsive to a single initial command signal.

Accordingly, it is an object of this invention to provide a method and apparatus for operating a plurality of machines mutually exclusively in a special operating mode in response to a single command issued to all machines.

It is a further object of this invention to provide an apparatus for controlling a plurality of independently operable machines, wherein said apparatus is characterized by minimal connections between the machines.

It is a further object of this invention to take advantage of a control unit capable of executing preprogrammed instructions or otherwise capable of carrying out a logic function, wherein each control unit is associated with each one of the said machines.

Other objects and the advantages of this invention will be apparent upon consideration of the detailed description of the preferred embodiments.

BRIEF DESCRIPTION OF THE DRAWINGS

The invention will be best understood by reference to the following detailed description taken in conjunction with the accompanying drawings in which:

FIG. 2 is a flow chart of a method according to the invention;

DETAILED DESCRIPTION OF PREFERRED EMBODIMENTS

The invention is described herein with reference to a drive sequencing apparatus in a digital computer with a mass storage and access system utilizing disk drives, each of which is driven by a spindle motor which operates continuously during computer operation and each of which is equipped with an independent control unit employing a preprogrammable microprocessing unit capable of rendering independent logic decisions in response to external stimuli. Other applications will be suggested for the method and apparatus herein disclosed, including any system equipped with independent control units wherein electric motors must be started substantially simultaneously thereby creating an excessive initial load, or in any such system wherein a machine must operate in a specials operating mode only during those times when other machines are not so operating. For ease of explanation, and to provide a specific example of one application of the inventive method and apparatus, discussion will be limited to mass storage systems and particularly to disk drive systems and related circuits.

Figure 1:
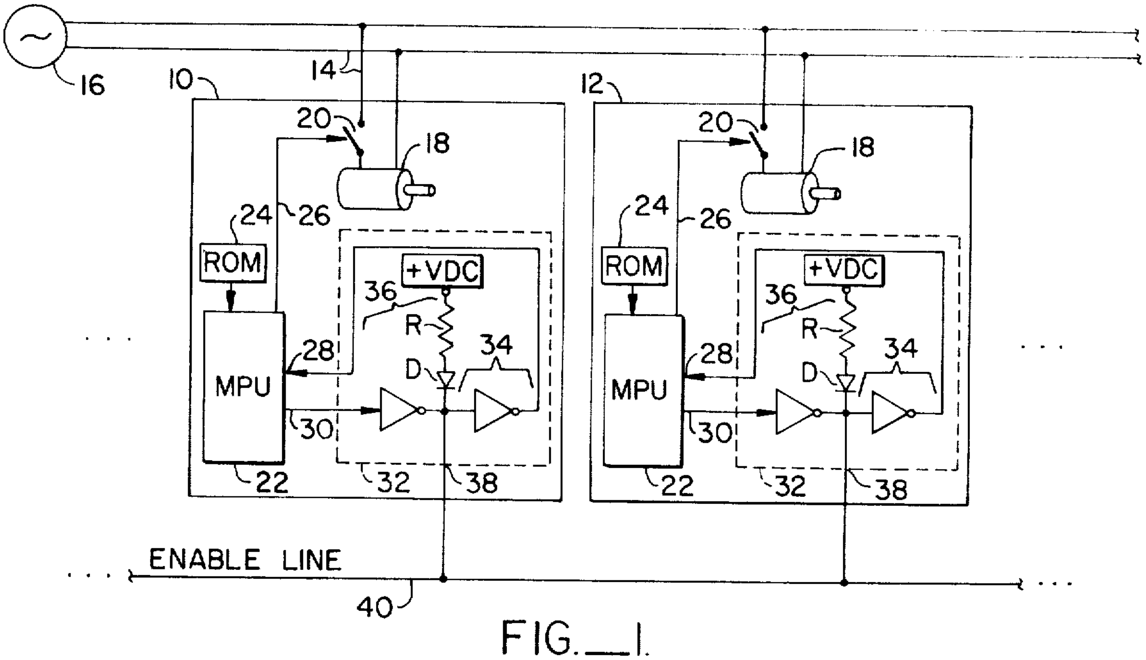
FIG. 1 is a block diagram of an apparatus according to the invention.

Turning to FIG. 1 there is illustrated a plurality of disk drives 10 and 12 coupled in parallel to power mains 14 of a power source 16. Specifically, the mains 14 connects with a spindle motor 18 through a power switch 20. The spindle motor 18 drives a disk (not shown), and, as is characteristic of most electric motors, draws a large amount of current as the motor starts up when power is first applied. If all of the switches 20 of each of the drives 10, 12 are closed simultaneously, it is possible that an intolerable excessive current may be drawn causing damage to the power source 16 and to the mains 14. It is one object of this invention to prevent occurrence of such an undesirable condition.

The disk drives 10, 12 are drives equipped with a self-sufficient or stand-alone intelligent control unit such as a microprocessing unit 22 capable of executing preprogrammed instructions or of carrying out a logic function in response to digital input signals. One such disk drive is the Model 7350 manufactured by the ISS operation of the Sperry Univac Division of Sperry Corporation, Cupertino, California. The disk drives 10, 12 of the embodiment herein described include a microprocessing unit (MPU) 22 with a preprogrammed Read Only Memory (ROM) 24 coupled thereto. The microprocessing unit 22 includes a control line 26 which turns switch 20 on and off in response to a command generated by the MPU 22. The MPU 22 and ROM 24 together comprise a controller or control means for the individual drives 10, 12. The control means and specifically the MPU 22 includes an input terminal 28 and an output terminal 30 for communication with sensor means 32.

Sensor means 32 comprises two circuit portions, namely a sensor circuit 34 and a sender circuit 36. The sensor means 32 is connected at a common input/output terminal 38 to a signal and control line, hereinafter called an Enable line 40, which is coupled in common with the sensor means input/output terminal 38 of all drives 10, 12. The Enable line 40 is a digital signal line referenced to the common or ground (not shown) of the entire system.

In FIG. 1, the signal Enable line 40 is coupled through the common input/output terminal 38 to a common node of the sensor 34 and sender 36. The sensor 34 may comprise a type 7404 inverter gate coupled directly to the MPU input terminal 28. The sender 36 may comprise a type 7406 open collector gate circuit with a resistor R and normally forward biased diode D coupled between the common node of input/output terminal 38 and a DC voltage at a logic reference level (+ VDC).

Diode D in the load circuit of open collector output of sender 36 operates to bias the Enable line 40 to a high or positive voltage state whenever the output stage of the sender 36 of any of the sensor means 32 is inactive.

In the particular embodiment herein disclosed the Enable line 40 is normally positive when no drive 10, 12 is powering up. Whenever a particular drive 10, 12 is powering up, its control means through its MPU 22 sends a signal at output terminal 30 to sender 36 to set the Enable line 40 to low voltage to signify to all other drive sensors 34, and hence to their related MPUs 22, that all other activated drives must wait before beginning a powering up sequence.

The particular start up technique, or "power up sequencing technique" as it is called according to the invention, is explained in connection with FIG. 2. FIG. 2 is a flow chart of a particular embodiment of the power up sequencing according to the invention. A computer program listing for the Read Only Memory 24 in the assembly language of a National Semiconductor Type 8080 microprocessing unit is disclosed in Appendix A hereto. The program of Appendix A controls the sequencing of drives so that only one drive at a time is permitted to start up.

Referring to FIG. 2, the first step after the AC power switch is turned on is to perform a purge cycle to evacuate the chambers containing the disk drives. A control signal is supplied through a register (not shown) to the Enable line 40 (FIG. 1) to establish a state herein called "+ Kill Sequence Enable", which in the circuit of FIG. 1 corresponds to a positive logic voltage at output terminal 30. Thereafter a basic time delay is commenced to allow all other devices to initialize (for the duration of the purge cycle).

Figure 3:
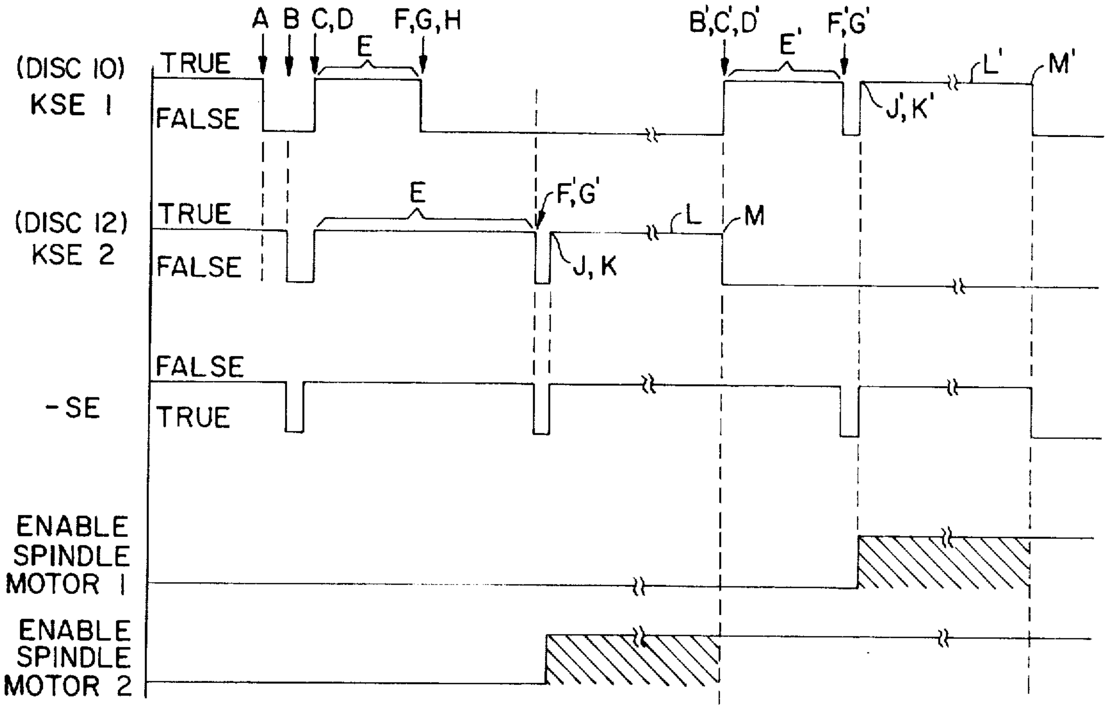
FIG. 3 is a timing diagram associated with the circuit of FIG. 1.

At the conclusion of the basic time delay, the MPU 22 commences the power up sequencing routing and releases or negates the "+ Kill Sequence Enable" signal. This corresponds to Point A on the timing diagram of FIG. 3 and Block A of FIG. 2. The Enable line 40 is substantially continuously sampled at the input terminal 28 of MPU 22. The "− Sequence Enable" signal in FIG. 3 is FALSE (high) whenever the Enable line 40 is FALSE (low) since they are related by the inverter circuit of sensor 34. As soon as all "+ Kill Sequence Enable" signals are negated (see FALSE) then the "− Sequence Enable" signal goes TRUE. This corresponds to Point B in the timing diagram in FIG. 3 and Block B of the flow diagram of FIG. 2. Thereupon, after an inconsequential delay to allow the MPU 22 to respond, the various MPUs 22 set the "+ Kill Sequence Enable" signal at output terminal 30 to TRUE (Point C of FIG. 3, Block C of FIG. 2), and each MPU 20 starts a delay function which is unique to the drive with which it is associated. For example, the delay may vary between about 120 microseconds and about 1.2 milliseconds. The length of the delay may be computed by multiplying the address of the drive + 1 by 120 microseconds. (Block E of FIG. 2 and intervals E on KSE 1 and KSE 2 of FIG. 3). At the conclusion of the delay, the MPU 22 sets the "+ Kill Sequence Enable" to FALSE (Block F) so that the sender 36 releases Enable line 40. Immediately thereafter, the MPU 22 samples input terminal 28 to determine if the "− Sequence Enable" is TRUE (Block G). If not, the MPU 22 directs that program function return to the beginning of the sequence (Block G) and continue sampling input terminal 28 (Block B in FIG. 2; Point B′ in FIG. 3).

In the interim, the sequential operation of each of the MPUs 22 and the disk drives 10, 12 has been spaced out. The second disk drive 12 at the conclusion of its timing interval E sets its "+ Kill Sequence Enable" FALSE (Point F′), to release the Enable line 40 and then samples the input terminal 28. If no other drive is holding the Enable line 40 high, the "− Sequence Enable" will be TRUE, as shown in FIG. 3, and the MPU 22 will direct the start of the spindle motor (Points, Blocks J, K of FIGS. 2 and 3) via line 26 (FIG. 1).

The MPU 22 then imposes a delay of a period of about 12 to 15 seconds during which the motor 18 is brought up to speed (Interval L FIG. 3). When the motor is up to speed, the MPU 22 sets the "+ Kill Sequence Enable" signal FALSE (Point, Block M), and the disk drive is transferred to on-line operation.

With the "+ Kill Sequence Enable" signal in the FALSE state, the MPUs 22 of those disk drives which have been diverted begin again the sequence at the steps corresponding to Block B in FIG. 2 (Point B′ in FIG. 3). The MPU 22 follows through steps corresponding to point C′, D′, interval E′, F′ and G′, as shown in FIG. 3, until the spindle motor start sequence (Point J') can be commenced.

The time delay (Interval E) unique to each of the drives herein described is important to spread out the operation of each of the disk drives. The consequence of the time delay mechanism herein described is that the drive assigned the shortest time delay will never be the first to start its motor if two or more drives simultaneously see the "− Sequence Enable" TRUE signal in the step corresponding to Block B of FIG. 2. This is because the last one of any of the drives to pass through the delay portion of the queuing process of the invention will always fall through to the motor start sequence. All others will be caught in a lock out condition and be rejected to the start of the queuing process.

It is important to note that the invention does not control the order in which any of the drives will start. It only provides that the drives start at mutually exclusive times. The drives can do this with merely the information that Enable line 40 is available. An unlimited number of such machines may be operated sequentially in the manner herein described.

Figure 4:
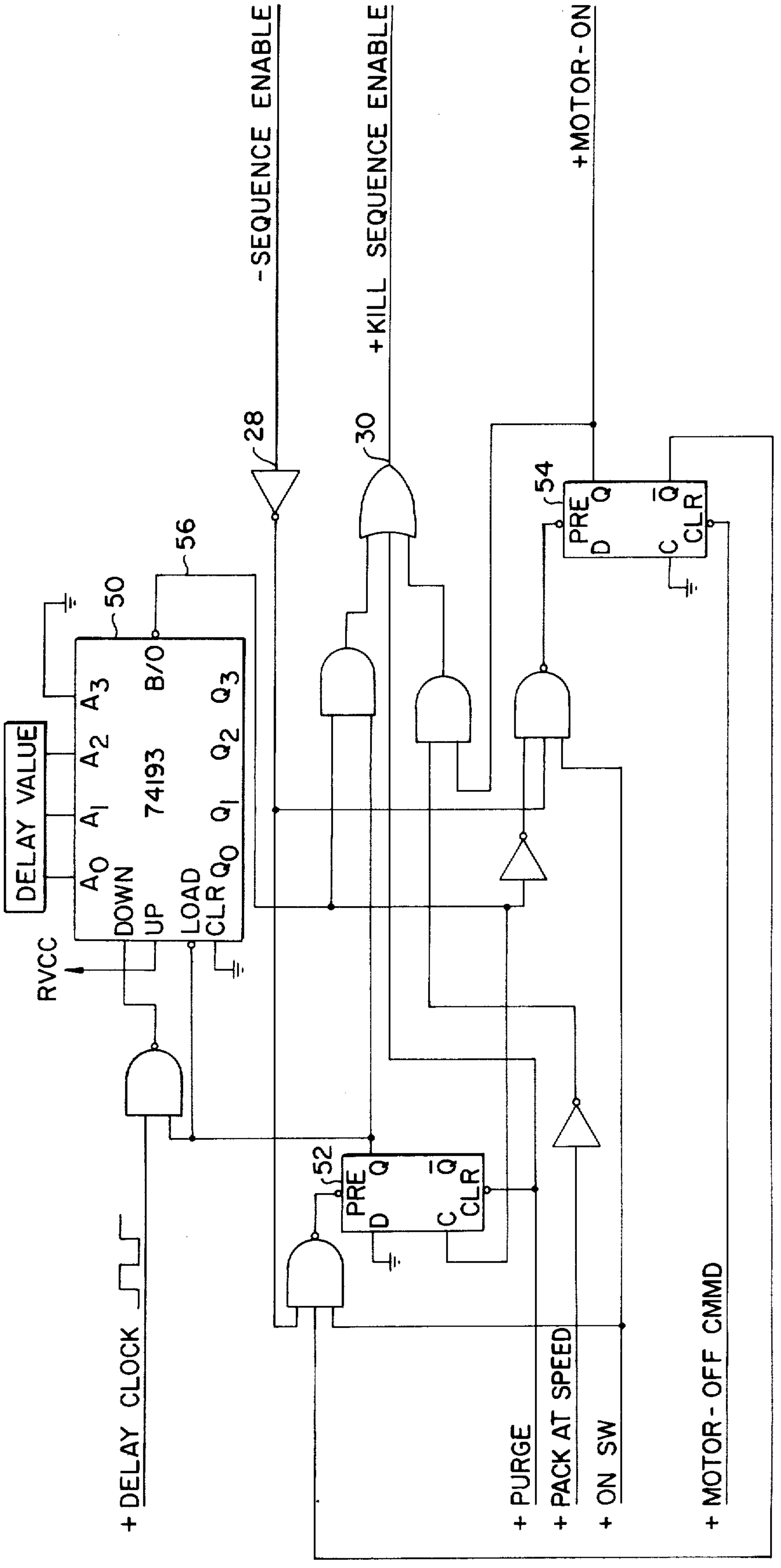
FIG. 4 is a logic diagram of a control unit operative according to the method of the invention.

The algorithm of FIG. 2 can also be implemented using random sequential logic. Referring to FIG. 4 there is shown a diagram of one possible hardware implementation of the algorithm. The circuit is built around a delay timer 50, a delay mode control latch 52 and a spindle motor control latch 54. In addition to input terminal 28 and output terminal 30, the circuit includes a clock input + Delay Clock, an ON switch input (+ ON SW) and various logic sensors such as a sensor to indicate when the disk pack is at the proper speed (+ Pack At Speed) and a sensor to indicate when the drive is operating in the initial purge cycle (+ Purge). The other circuit components and the interconnections therebetween are straight forward, the components consisting of inverters, AND gates, and OR gates interconnecting the delay timer 50, the delay mode latch 52 and the spindle motor control latch 54 with input terminal 28 and output terminal 30. The delay timer may be a type 74193 modular integrated timing circuit. The inputs A0, A1 and A2 are provided with unique values determinative of the variable to be used in the delay function (See Block D of FIG. 2). The function "+ Kill Sequence Enable" is FALSE whenever the Q output of the delay mode latch 52 is FALSE, the negated B/O output 56 of the delay timer 50 is FALSE and certain special mode hardware related functions have been attended to. Such hardware related functions include completion of the purge cycle and completion of the motor start-up sequence indicating that the disk pack is at the desired speed.

The invention has now been explained with reference to specific embodiments. Other embodiments will be apparent to those of ordinary skill in the art and therefore the invention is not intended to be limited except as indicated in the appended claims.

APPENDIX A

Sequencing Routine Assembly Language Listing (8080 Assembly Language)

```
                 ;   SEQUENCING ROUTINE  REV 3      12/15/77
                 ;
                 ;  THIS ROUTINE DOES ESSENTIALLY THREE THINGS:  FIRST, IT CONTROLS THE
                 ;   SEQUENCING OF THE DRIVES SO THAT ONLY ONE DRIVE AT A TIME WILL START UP;
                 ;   SECOND:  ONCE A DRIVE STARTS THE ROUTINE MAKES SURE THAT IT GETS UP TO
                 ;   SPEED FAST ENOUGH;  THIRD:  IT CAUSES THE DRIVE TO LAND ON TRACK 0.
                 ;

                      CHECK SEQUENCE ENABLE  LOOP UNTIL IT IS TRUE
                 ;
01DB 06 01           MVI   B,01H              ;PUT COUNT OF 1 IN REG B
01DD DB 04           IN    MSSTAT             ;READ IN STATUS REGISTER
01DF E6 02           ANI   02H                ;MASK IN -SEQ. ENABLE BIT
01E1 C2 CE 01        JNZ   FS1                ;LOOP UNTIL -SEQ. ENABLE = 0
                 ;
                 ; SEQ. ENABLE TRUE, KILL SEQ. ENABLE AND START TIMEOUT.  THE LENGTH OF
                 ;  THE TIMEOUT EQUALS THE COMPLEMENT OF THE DRIVE'S MOD. SELECT NUMBER TIMES
                 ;  120 MICRO-SECONDS.
                 ;
01E4 3A 10 18        LDA   MMSTAT             ;GET CURRENT IMAGE OF STATUS OUTPUT REG.
01E7 F6 10           ORI   10H                ;SET KILL SEQ.
01E9 D3 04           OUT   MSSTAT             ;ENABLE BIT
01EB 32 10 18        STA   MMSTAT             ;STORE NEW STATUS BACK IN MEMORY
01EE DB A0           IN    MODSEL             ;INPUT DRIVE'S MOD. SELECT #
01F0 E6 0F           ANI   0FH                ;MASK IN MOD. SEL BITS
01F2 07              RLC                      ;MULTIPLY
01F3 07              RLC                      ;BY
01F4 07              RLC                      ;16
```

```
01F5 07                 RLC
01F6 3D          PS5    DCR  A                    ;DECREMENT THIS
01F7 C2 F6 01           JNZ  PS5                  ;COUNT UNTIL 0
                 ;
                 ; TIMEOUT COMPLETE, RELEASE SEQ. ENABLE LINE AND THEN CHECK THE
                 ;  LINE.  IF NO OTHER DRIVE IS STARTING UP OR TIMING OUT THEN THE LINE WILL
                 ;  BE ENABLED AND THE DRIVE CAN START THE MOTOR
                 ;
01FA 3A 10 18           LDA  MMSTAT               ;GET CURRENT IMAGE OF STATUS OUTPUT REG
01FD E6 EF              ANI  0EFH
01FF 32 10 18           STA  MMSTAT               ;STORE IMAGE BACK IN MEMORY
0202 D3 04              OUT  MSSTAT               ;RESET KILL SEQ. ENABLE BIT
0204 DB 04              IN   MSSTAT               ;READ STATUS INPUT
0206 E6 02              ANI  02H                  ;MASK IN -SEQ. ENABLE BIT
0208 C2 CE 01           JNZ  PS1                  ;GO BACK TO START IF NOT ENABLED
                 ;
                 ; START MOTOR AND KILL SEQUENCE ENABLE, THEN ENTER THE ROUTINE WHICH
                 ;  CHECKS TO SEE THAT THE PACK IS COMING UP TO SPEED FAST ENOUGH.  ONCE
                 ;  THE MOTOR IS STARTED IT CANNOT BE STOPPED BY MEANS OF THE ON-SWITCH UNTIL
                 ;  IT HAS COME UP TO SPEED

                 ;
020B D3 07              OUT  CPUUNS               ;REFRESH CPU UNSAFE CIRCUIT
020D 3A 10 18           LDA  MMSTAT               ;GET CURRENT IMAGE OF STATUS OUTPUT REGISTER
0210 E6 FD              ANI  0FDH                 ;TURN MOTOR ON AND
0212 F6 10              ORI  10H                  ;SET KILL SEQUENCE
0214 D3 04              OUT  MSSTAT               ;ENABLE BIT
0216 32 10 18           STA  MMSTAT               ;STORE IMAGE BACK IN MEMORY
                 ;
                 ;      THE NEXT FEW LINES HANDLE THE CASE WHERE THE PACK FAILS TO COME
                 ;  UP TO SPEED
                 ;
028D 06 C2              MVI  B,0C2H               ;PUT ERROR CODE IN REG B
028F 78                 MOV  A,B                  ;MOVE TO ACC
0290 D3 05              OUT  ERSTAT               ;SEND OUT PERMANENT ERROR STATUS
0292 3A 10 18           LDA  MMSTAT               ;PUT MEMORY IMAGE OF CONTROL REG INTO ACC
0295 F6 02              ORI  02H                  ;RESET MOTOR ON BIT
0297 E6 6F              ANI  6FH                  ;RESET KILL SEQ ENABLE, SET DEVICE CHECK
0299 D3 04              OUT  MSSTAT               ;SEND OUT NEW CONTROL WORD
029B 32 10 18           STA  MMSTAT               ;STORE IMAGE BACK IN MEMORY
029E 3E 04              MVI  A,04H                ;SEND OUT ON-LINE TO CONTROLLER WHEN
02A0 D3 71              OUT  IOSTAT               ;PORTS ARE ENABLED
02A2 CD D6 03           CALL LOG                  ;LOG ERROR
02A5 C3 C6 0D           JMP  HOLD                 ;JUMP TO HOLD ROUTINE
                 ;
                 ; DISK SPEED O.K., CONTINUE WITH SEQUENCING
                 ;
02A8 3E 80       PS9    MVI  A,80H                ;DISABLE TIMER
02AA D3 01              OUT  MASK                 ;INTERRUPTS
02AC 3E FF              MVI  A,0FFH               ;SET MEMORY FLAG TO
02AE 32 1A 18           STA  PATSPD               ;INDICATE PACK AT SPEED
02B1 CD 00 08           CALL SWITCH               ;CHECK SWITCHES
02B4 3A 10 18           LDA  MMSTAT               ;GET CURRENT IMAGE OF STATUS OUTPUT REG.
02B7 E6 EF              ANI  0EFH                 ;RESET THE KILL SEQUENCE
02B9 D3 04              OUT  MSSTAT               ;ENABLE BIT TO ENABLE OTHER DRIVE SEQUENCING
02BB 32 10 18           STA  MMSTAT               ;STORE IMAGE BACK IN MEMORY
                 ;
```

What is claimed is:

1. In a digital computer information storage and access system having an arbitrary number of independently operative mass storage drives, each drive characterized by an electric motor adapted to operate continuously during data storage and access and further operative to start up in response to a motor start signal, an apparatus for directing the random sequential starting up of all said motors, said apparatus comprising:

a single signal and control line coupled in common to each one of said drives and operative to convey a TRUE-FALSE signal from a central controller having no knowledge of the state of operation of said drives, said TRUE-FALSE signal indicating in a first state the disallowability of a drive to enable a motor start up sequence;

a first circuit means associated with each one of said drives and coupled to said signal and control line for sensing said TRUE-FALSE state signal and conveying said state signal to a third circuit means;

a second circuit means associated with each one of said drives and coupled at a common node with said first circuit means to said signal and control line for overriding said TRUE-FALSE signal to establish said first state on said signal and control line in response to a signal from a third circuit means; and a third circuit means associated with each one of said drives and responsive to said first circuit means of said associated drive for issuing, in response only to a second state of said TRUE-FALSE state signal conveyed to it by said first circuit means, said motor start signal to said motor associated therewith and operative to issue said disallow sequence enable signal to said second circuit means and thereby to cause said second circuit means to override said signal and control line in order to prevent any other motor to start up for the duration of said override signal.

2. An apparatus according to claim 1 wherein said third circuit means comprises a digital central processing unit capable of executing preprogrammed instructions and a digital memory means coupled to said central processing unit and organized to contain an algorithm of preprogrammed instructions, said central processing unit and said memory means comprising control means capable of executing said preprogrammed instructions.

3. An apparatus according to claim 2 wherein said memory means is permanently preprogrammed.

4. An apparatus according to claim 1 wherein said third circuit means further comprises means coupled to said first circuit means for continuously sampling the output of said first circuit means to sense the releasing of said signal and control line by all of said drives.

5. An apparatus according to claim 4 wherein said third circuit means further includes means for executing a time delay unique to each one of said drives after said sampling means has sensed the releasing of said signal and control lines; means for allowing the last one of any of said control means having executed said unique time delay to issue said disallow sequence enable signal to said second circuit means associated with said control means and to issue said start motor signal to said motor associated with said control means.

6. In a digital data mass storage access system comprising an arbitrary number of independent drives, each drive characterized by an electric motor which operates continuously during data storage and access and which is further operative to start up in response to a motor start signal, a single signal and control line for conveying a TRUE-FALSE state signal from a central controller having no knowledge of state of operation of said drives to each one of said drives to indicate the allowability of a motor associated therewith to start up, a first circuit means associated with each one of said drives and coupled to receive input signals only from said signal and control line for sensing said TRUE-FALSE state signal and operative to convey said state signal to a control means associated with each one of said drives, a second circuit means associated with each one of said drives and coupled to said signal and control line for overriding at least one digital state of said signal and control line only in response to a signal from said control means associated with said associated drive, and a plurality of control means, each control means being associated with one of said drives and responsive only to said first circuit means associated with said associated drive for issuing said motor start signal to said motor associated therewith and operative to issue a signal to disallow a sequence enable function, i.e., a disallow sequence enable signal, to said second circuit means and thereby to cause said second circuit means associated with said associated drive to override said signal and control line, wherein each one of said control means is capable of responding only to an override signal from said first circuit means and to operating conditions of its associated motor, a method for directing the random sequential starting up of all of said motors wherein circuitry in each drive performs the method comprising the steps of:

continuously sampling the state signal of said single signal and control line through said first circuit means to sense the releasing of said signal and control line;

after sensing the releasing of said signal and control line, issuing said disallow sequence enable signal through said second circuit means associated with said first circuit means in order to capture said signal and control line and to lock out all other drives; thereupon starting up said motor associated with said first circuit means; and after said starting up, causing said second circuit means to release said signal and control line such that all of said motors start up in a random mutually exclusive sequence.

7. A method according to claim 6 wherein immediately after any one of said first circuit means senses said releasing, said control means associated with said one first circuit means performs the steps of:

executing a time delay unique to said drives associated therewith;

allowing the last of any one of said control means to have executed said unique time delay after said sensing to issue said disallow sequence enable signal to said second means associated with said control means and to issue said start motor signal to said motor associated with said control means; and repeated said sampling step, said time delay step and said allowing step for each said motor to be started up.

8. A method according to claim 7 wherein said time delay is equal to a constant multiplied by a number derived from an identification number of each one of said drives.

9. A method according to claim 8 wherein each time delay is greater than about 120 microseconds and less than about 1.2 milliseconds.

10. In a machine system having an arbitrary number of independently operated machines, each machine characterized by a special operating mode during which no other one of said machines should operate and which may be initiated in response to a command signal simultaneously issued to all of said machines, an apparatus for directing the random sequential operation of all of said machines in said special operating mode, said apparatus comprising:

a single signal and control line adapted to convey a digital logic signal to all of said machines, wherein said signal and control line in a first logic state indicates that none of said machines which is not operating in said special operating mode should be permitted to initiate said special operating mode, and in a second logic state indicates that any one of said machines is permitted to initiate said special operating mode, said single signal and control line providing the exclusive indication of allowability of said special operating mode;

a plurality of first circuit means, each first circuit means being associated with a single one of said machines and adapted to couple to said signal and control line for monitoring the digital state of said signal and control line;

a plurality of second circuit means, each second circuit means being associated with a single one of said machines and adapted to couple to said signal and control line at a common node with said associated first circuit means for overriding at least one digital state of said signal and control line; and means in each of said machines responsive to said first circuit means for controlling said second circuit means and for initating said special operating mode of said associated machine.

11. An apparatus according to claim 10 wherein said controlling and initiating means comprises a random logic circuit means operative to cause said second circuit means to set said signal line to said first logic state whenever said controlling and initiating means senses through said first circuit means that said signal and control line is in said second logic state and said associated machine is prepared to commence said special operating mode.

12. An apparatus according to claim 11 wherein said first circuit means comprises a gate circuit and said second circuit means comprises a gate circuit, the output of said second circuit means being a load which may be isolated from a voltage reference level through a diode and which is coupled to the input of said first circuit means at a node of said signal and control line.

13. An apparatus according to claim 10 wherein said controlling and initiating means comprises a third circuit means capable of executing preprogrammed instructions and a digital switch means comprising a plurality of ordered digital switches representative of an algorithm of preprogrammed instructions executable by said third circuit means, said switch means being coupled to said third circuit means.

14. An apparatus according to claim 10 wherein each said machine includes an electric motor, and said special operating mode includes the starting up of said electric motor, and said command signal is a motor start up signal, said apparatus being operative to inhibit excessive electric power load during the starting up of any of said electric motors.

15. A method for directing the random sequential operation in a special operating mode of a plurality of independently operable machines in a machine system having an arbitrary number of independently operating machines, each machine being characterized by said special operating mode during which no other one of said machines should operate and which may be initiated in response to a command signal simultaneously issued to all of said machines, each machine being associated with an apparatus for directing the random sequential operation of all of said machines in said special operating mode, wherein said apparatus comprises a single signal and control line for conveying a digital logic signal to all of said machines which in a first state indicates that none of said machines which is not operating in said special operating mode should be permitted to initiate said special operating mode and in a second logic state indicates that any one of said machines is permitted to initiate said special operating mode, a plurality of first circuit means, each first circuit means being associated with one of said machine and being coupled to said signal and control line for monitoring the digital state of said signal and control line, a plurality of second circuit means, each second circuit means being associated with one of said machines and being coupled to said signal and control line for setting at least one digital state of said signal and control line, and a plurality of independently operative control means, each control means being associated with one of said machines and being responsive to an output of said first circuit means for controlling said second circuit means and exclusively for initiating said special operating mode of said associated one of said machines, said method comprising the steps of:

continuously monitoring through each one of said first circuit means the status of said signal and control line for occurrence of said second logic state signal;

continuously sampling through said control means the output of said first circuit means to sense for each second logic state signal;

in response to said second logic state signal, issuing through said second circuit means said first logic state signal to said signal and control line, thereby to indicate to all other first control means coupled to said signal and control line that none of said machines which is not operating in said special operating mode should be permitted to initiate said special operating mode; and issuing through said second circuit means said second logic state signal after a predetermined period such that in response to said second logic state signal, all of said machines are caused to operate in said special operating mode in a random sequential mutually exclusive manner.

16. A method according to claim 15 wherein said causing step comprises executing a time delay unique to each one of said machines after said sampling step has sensed said second operating state signal; allowing the last of any of said control means to have executed said unique time delay to issue said first logic state signal to said second circuit means associated with said control means and to issue a start machine signal to said machine associated with said control means.

* * * * *